(12) United States Patent
Borosak

(10) Patent No.: US 8,786,490 B2
(45) Date of Patent: Jul. 22, 2014

(54) MULTIBAND RADAR DETECTOR CALIBRATOR

(76) Inventor: Marko Borosak, Zagreb (HR)

( * ) Notice: Subject to any disclaimer, the term of this patent is extended or adjusted under 35 U.S.C. 154(b) by 449 days.

(21) Appl. No.: 13/379,464

(22) PCT Filed: Jun. 30, 2009

(86) PCT No.: PCT/HR2009/000024
§ 371 (c)(1),
(2), (4) Date: Dec. 20, 2011

(87) PCT Pub. No.: WO2011/001193
PCT Pub. Date: Jan. 6, 2011

(65) Prior Publication Data
US 2012/0098696 A1    Apr. 26, 2012

(51) Int. Cl.
*G01S 7/40* (2006.01)
*G01S 7/02* (2006.01)
*G09B 9/40* (2006.01)

(52) U.S. Cl.
CPC .............. *G01S 7/4052* (2013.01); *G01S 7/4021* (2013.01); *G01S 7/022* (2013.01); *G09B 9/40* (2013.01)
USPC ............................................ 342/174; 342/20

(58) Field of Classification Search
CPC ....... G01S 7/4021; G01S 7/4052; G01S 7/40; G01S 7/4004
USPC ............................................ 342/173–174, 20
See application file for complete search history.

(56) References Cited

U.S. PATENT DOCUMENTS

| 4,236,140 | A | 11/1980 | Aker et al. |
| 4,961,074 | A | 10/1990 | Martinson |
| 5,122,802 | A | 6/1992 | Marin |
| 5,133,663 | A | 7/1992 | Willingham et al. |
| 5,191,348 | A | 3/1993 | Brocia et al. |
| 5,552,791 | A * | 9/1996 | Metal ............................ 342/174 |
| 7,023,374 | B2 * | 4/2006 | Jossef et al. .................... 342/20 |
| 7,215,276 | B2 | 5/2007 | Batten et al. |
| 2004/0263378 | A1 * | 12/2004 | Jossef et al. .................... 342/20 |
| 2012/0098696 | A1 * | 4/2012 | Borosak ........................ 342/169 |
| 2012/0244824 | A1 * | 9/2012 | Entezari et al. ............. 455/114.2 |
| 2012/0252382 | A1 * | 10/2012 | Bashir et al. ............... 455/114.3 |

FOREIGN PATENT DOCUMENTS

GB        2 149 624    A    6/1985

OTHER PUBLICATIONS

McGarvey et al., "Sept-Improving JSECST/ECSAMS in Concert With the ATS Framework," Autotestcon, 2007 IEEE, Sep. 1, 2007, pp. 72-79.
International Search Report and Written Opinion for PCT International Application No. PCT/HR2009/000024 mailed Apr. 1, 2010.

* cited by examiner

*Primary Examiner* — John B Sotomayor
(74) *Attorney, Agent, or Firm* — RatnerPrestia

(57) ABSTRACT

The invention discloses the multiband radar detector calibrator. The calibrator includes a user interface with a keypad and a display, a microcontroller unit that includes pre-stored values in the database and the algorithm—decision logic, digital to analog converter, signal conditioning circuit and voltage controlled oscillators, with their appropriate antennas. The core of invention is the generation of a calibrating microwave signal which resembles the microwave input that a radar detector device would receive in an encounter with a radar device in the field.

3 Claims, 5 Drawing Sheets

MULTIBAND RADAR DETECTOR CALIBRATOR

CROSS REFERENCE TO RELATED APPLICATIONS

This application is the U.S. National Phase Application of PCT International Application Number PCT/HR2009/000024, filed Jun. 30, 2009.

FIELD OF INVENTION

Invention concerns radar detector calibrators with multiple frequency band outputs that can transmit continuous, burst, multiple frequency at once, varying output power and other complex patterns associated with usual use of a radar detector device in the field. According to the international classification it is classified as:
G01S 7/40—Means for monitoring or calibrating
G01S 13/06—Systems determining position data of a target

BACKGROUND OF THE INVENTION

A common type of a radar detector device is one that monitors at least one known radar frequency bands. It has a broad band antenna, a local oscillator, mixer diodes, amplifiers and processing circuitry. The local oscillator frequency is mixed with radar signal from the antenna to produce an intermediate signal which is then amplified, converted detected and fed to signal processing circuitry (cf. U.S. Pat. No. 4,961,074, Martinson).

On the other hand a common type of a Doppler radar device is one that emits a continuous wave radio signal at preset frequency which is kept stable and monitors return of the reflected signal from the target. It has a narrow band antenna with high gain and tight radiation pattern, at least one mixer diode, amplifiers and processing circuitry. Travelling signal frequency changes when the signal is reflected of a target with exact change of frequency corresponding to the relative speed of the target.

Returned signal is mixed with the radar oscillator signal to produce an intermediate signal which is in this case same as the frequency shift caused by the reflection from a moving target. Frequency shift is processed by the processing circuitry and corresponding target speed is shown on the display of the unit (cf. U.S. Pat. No. 4,236,140, Aker). Radar engineers are aware that the radar signal can be detected by a radar detector device and many different ways have been implemented to avoid detection by a radar detector. First, more than one usual radar frequency was used, but radar detectors developed sweeping local oscillators that could scan a whole frequency band for a signal. Then higher frequency bands were used by radars that were multiple orders of magnitude higher than before, 10.250 MHz increased to 24.150 MHz and 34.300 MHz. In time technological advance of radar detectors made them able of sweeping even those higher frequency bands.

Then a range of possible preset radar frequencies within the frequency band was made extremely wide, 33.400 MHz to 36.000 MHZ. That made the sweeping of a radar detector in that band a long process, the accuracy of radar detection was low and the time it took to detect made it unusable.

Improved radar detectors could concentrate sweeping only to those areas of the super wide band that the radars used most often. Some radar detector devices have the possibility for its user to select which frequency sub-bands to sweep and which not to.

Finally some Doppler radar engineers developed a burst continuous wave radar. Since Doppler target speed measurement depends on the stable frequency of the transmitted radio signal a frequency hopping or sweeping methods can not be used because that would degrade the accuracy of the radar. One manufacturer developed a short burst CW radar, so called BEE III POP Mode™ radar. Time required for a valid target speed to be measured by this radar type is shorter than 67 ms and this radar never transmits its signal longer than 67 ms at a time. Between each measurement is an off period which makes it difficult for a radar detector to confirm the presence of a radar. At that time Radar detectors have usually confirmed the sweeping detection of a radar several times before considering the result as true.

To counter to this type of a radar, one radar detector has developed an advanced method to discriminate between false readings and short burst CW radar signal. Upon initial detection of a radar signal, sweeping of the local oscillator is focused on the frequency segment where the signal was found instead of continuing the sweep to the end of its range. Focused sweeping will either confirm the presence of a radar in relatively short time or it will conclude that it is not a radar signal in which case the local oscillator will be returned to the original sweep of the frequency range (cf. U.S. Pat. No. 7,215,276, Batten).

This gradual technological development of both the Doppler radar device and the radar detector device has led to them being a far more complex devices then before. Radar devices are usually manufactured by specialized manufacturers according to military and police specifications and production quantities are usually small. Thus the quality control for each manufactured device can be thorough resulting in high rate of fault detection by the manufacturer himself. Requirements of the military standard that usually applies to such radar devices additionally contribute to increased durability and a fault immune design. For those reasons a relatively small number of devices that exhibit some kind of a manufacturing fault is expected to reach users or distributors of such devices.

Contrary to Doppler radars a radar detector devices are manufactured by great many manufacturers. Many of which also manufacture other unrelated electronic products thus lowering the expected quality of the devices design. Radar detector devices are usually manufactured in large quantities often larger than 100.000 devices per year. It is also expected that users of a radar detector device will have limited funds when acquiring the device so manufacturers have to limit the device's research, manufacturing and quality control costs. For the mentioned reasons it is expected that significant number of manufactured devices will have some kind of manufacturing fault that will not be detected by the quality control of the manufacturer or that the devices will exhibit a fault during use.

Resolving the problem of a faulty radar detector devices reaching users is possible by additional quality controls performed by distributors of such devices or manufacturers additionally testing the devices. If a user finds a device to be faulty or questionable it needs to be properly tested at appropriate service locations using a radar detector calibrator device.

Besides testing the device's user interface for proper operation it is essential that device's main function is properly tested, detecting of a radar signal. Having a Doppler radar or more accurately all different kinds of Doppler radars and setting them up in different ways to test the radar detector device for a proper radar signal detection is not convenient or even always possible. That is why a radar signal is usually emulated to perform a radar detector main function testing.

Prior art radar detector calibrators are microwave frequency generators that generate a stable frequency CW signal in a frequency range up to 40 GHz or higher. Emulation of a radar signal is achieved by simply entering the desired output frequency on the microwave generator. Some microwave generators even have possibility of altering the output signal power and some have the possibility of transmitting a burst CW signals.

Testing a radar detector device with these prior art calibrators translates into a radar detector device detecting or not the selected frequency signal from the microwave generator.

How ever, situations in which a radar detector device will be used by the user do not resemble the described situation where a stable frequency signal is presented to the device. Usual encounter of a radar signal by the radar detector device in the field will more closely resemble a very weak signal slowly growing in strength with occasional strong interference signal from other microwave source.

The signal will also possibly be a 67 ms burst CW signal. Also a usual encounter would be a several reflected radar signals coming to a radar detector device from different directions at the same time.

Such complex emulations are hard to achieve even with several microwave generators and it would be required of them to be used in the field what is rarely possible with such expensive professional equipment.

The present invention overcomes the observed problems in the radar detector quality assessment in the segment of complete and true main function testing.

SUMMARY OF INVENTION

The present invention relates to the method and apparatus for calibrating a radar detector device in a manner that most closely represents a radar detector's use in the field. The preferred embodiment describes a multiband radar detector calibrator wherein the user trough the use of the controls and the display selects one of the pre-stored test procedures. Said test procedure is recalled from the memory of the microcontroller which then activates corresponding output values for its output ports. The microcontroller has been connected with the digital to analog converter and with the firing controls of the voltage controlled oscillators. DAC converts a digital signal to a voltage level which is then fed to the signal conditioning circuit to provide a voltage control signal for the voltage controlled oscillators. In addition, the said microcontroller has been equipped with the database of pre-stored test procedures for emulation of different radar types and multiple radars at once emulations.

BRIEF DESCRIPTION OF THE DRAWINGS

The invention is best understood from the following description when read in connection with the accompanying drawings. Included in the drawings is the following figures.

DETAILED DESCRIPTION OF THE INVENTION

Figure 1:
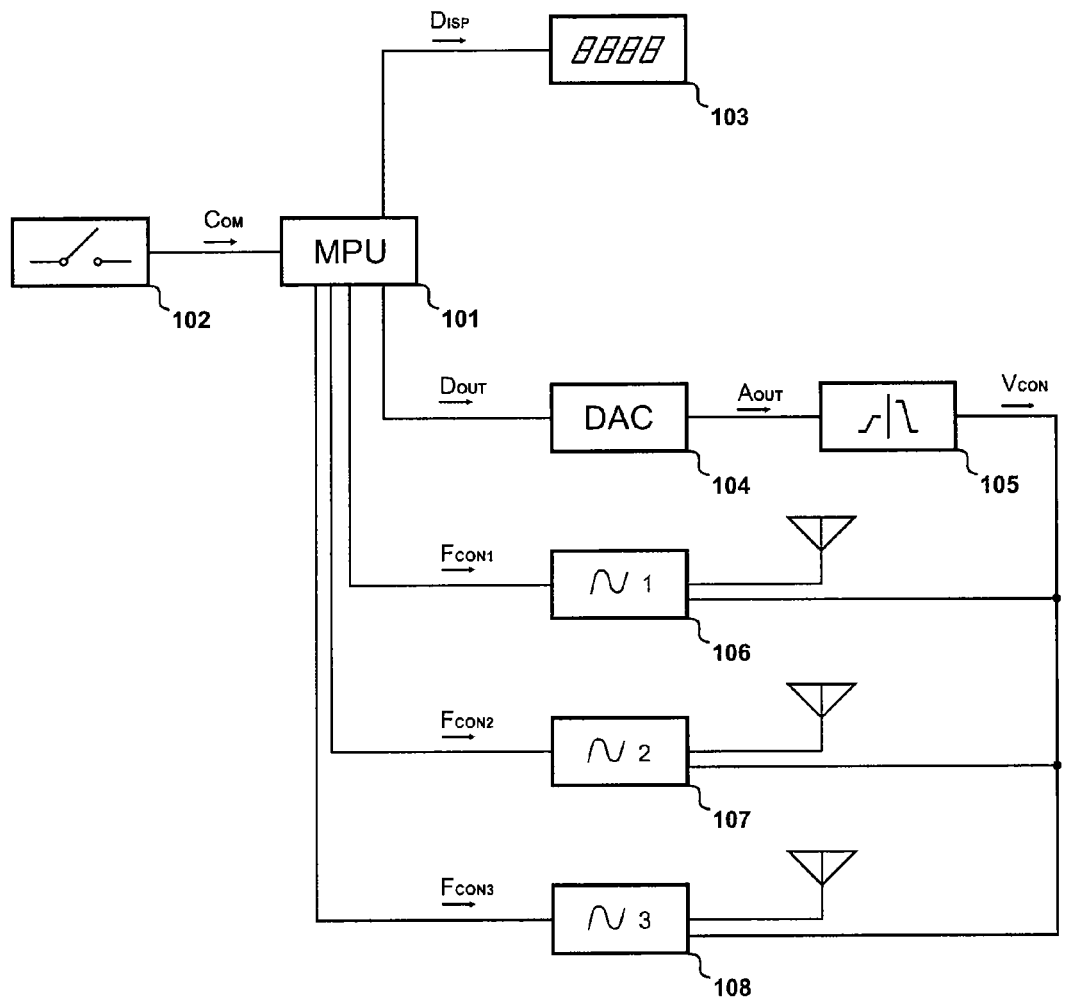
FIG. 1 shows a block diagram of the calibrator circuit showing how oscillator's outputs are controlled by the microcontroller and a user who is giving commands to the microcontroller.

A multiband radar detector calibrator circuit has been disclosed. Below are underlined definitions of the invention parts and corresponding short explanation of their technical functions.

The voltage controlled oscillator converts the electrical energy received from the power supply to a microwave frequency radio signal with the frequency corresponding to the control voltage.

Keypad with plurality of key switches are a first part of the user interface and are used to interpret user commands to the microcontroller.

The display means are a second part of the user interface and are used to show the state of the device to the user and acknowledge his commands.

The computing means are used to process the user interaction trough the user interface and according to the algorithm logic and pre-stored test procedures to control voltage controlled oscillators through the use of firing controls and DAC.

The test procedures are a sequence of actions taken by the microcontroller occurring in a precisely timed manner that as a result have emitting of microwave radio signal of a specific predetermined pattern.

The signal conditioning means are used to convert the DAC output voltage to a higher level voltage necessary for the frequency control of the VCO.

The firing controls means are used to convert the digital firing signal into a VCO power supply voltage with the voltage value depending on the duty cycle of the digital signal.

The storage means are provided for storing, reading and writing data such as a battery voltage and power off time.

The database means contain pre-stored test procedures with the possibility of adding and changing user defined additional test procedures.

An algorithm means are used to insure optimal operation of the device by monitoring the battery voltage, turn off time and to guide the user through the user interface.

The primary aim of the present invention is to enable calibrating and tuning of radar detector devices.

Additionally the presented multiband radar detector calibrator is to be used as a means for a functional testing of a radar detector device by the user, seller or service personnel of the radar detector device in a manner that most closely represents radar detector's use in the field.

Application of an aspect of the present invention will enable quick discovery of possible faults and problems in a radar detector device and will aid in resolving of a detected problem.

In depth testing using the present invention is achieved by creating a scenario test procedures that trigger complex radar like emissions with repeatability not normally possible with ordinary use of radar signal sources.

Pre-stored test procedures in a microcontroller of the radar detector calibrator are designed to create radar emissions which by its varying power, change in frequency and emitting sequence most closely emulate a scenario in which a radar detector device will meet a certain type of a radar device in the field. Since all settings are pre-stored and the microcontroller conducts the procedures exactly the same way each time, the scenario can be emulated many times with no discrepancies between each emulation. This enables detection and then resolving of weaknesses and faults in a radar detector device which will not be possible with the prior art means.

Even using radar devices in the field and testing a radar detector device in a such set scenario will not result in same exact radar emissions entering the radar detector device on each run because in average field test many of the test factors are not fixed even if they seem they are. This factors include; a vehicle carrying the radar detector device not travelling the exact same pattern each time resulting in different radar reflections entering the radar detector device on each run, changes in ambient temperature, possible interference from other devices in the vehicle carrying the radar detector device, other vehicles or obstacles moving in the vicinity of the field test causing changes in the reflected radar signal scatter.

Described multiband radar detector calibrator circuit is likely to be first one that has embedded a dedicated microcontroller unit with complex pre-stored test procedures stored in a memory database. In addition by having a control over the power output of each of the oscillators and their output frequency the microcontroller will be able to emulate even future radar device signals if appropriate new pre-stored test procedures are entered in its memory.

The user of the radar detector calibrator is controlling the device with the user interface consisting of a keypad with one or more key switches and a display. The display shows the present condition of the device and all choices made by the user trough the keypad. The display additionally shows battery status, set-up and error messages.

When a test procedure is chosen the microcontroller will trough the use of the firing controls activate one or more voltage controls oscillators (VCO) and set their emitting power. Additionally trough the plurality of digital to analog converters the microcontroller sets the emitting frequency of the oscillators. Since the voltage controlled signal for the VCO varies from 0 V to 20 V and the DAC output can not be greater than 5 V the DAC output signal is fed to the signal conditioning circuit first.

Voltage controlled oscillators will emit a radar signal with its power depending on the voltage of the VCO power supply and its frequency depending on the voltage of the VCO frequency control input.

Radar detector device under test will either alert according to a selected test procedure with its signal strength indicator corresponding to the emitting power of the test procedure selected and its frequency band indicator corresponding to the selected frequency of the test procedure or it will misinform. Misinformation can be the lack of any alert to the running test procedure of the radar detector calibrator or it can be an erroneous type of an alert with either signal strength or frequency band not showing the correct information or both.

Some radar detector devices indicate the number of different radar signals detected so that indicator is tested as well by the test procedures that implement more than one radar signal emitting at the same time.

Preferred Embodiment

The circuitry and the functional detail of the preferred embodiment in accordance with the invention will be explained in detail in the following paragraphs.

FIG. 1 illustrates the block diagram of a multiband radar detector calibrator according to the present invention.

A Keypad with plurality of key switches 102 converts user commands to a digital command signal $C_{OM}$. Said digital signal is sent to the microcontroller unit 101 that interprets the users commands and acknowledges them by the display signal $D_{ISP}$ sent to a display 103 for a user to see. The said microcontroller 101 is processing data received from the user interface and other data necessary for the proper operation of the device such as the battery voltage and the turn off time. The display 103 also shows to the user the current state of the device and other operational messages. User is selecting one of the pre-stored test procedures through the user interface consisting of the keypad 102 and the display 103. Upon selection of a test procedure the microcontroller 101 in a pre-stored sequence of actions corresponding to the selected test procedure is activating the firing controls of the voltage control oscillators 106, 107 and 108 trough the use of signals $F_{CON1}$, $F_{CON2}$ and $F_{CON3}$. By changing the duty cycle of the firing control signals $F_{CON1}$, $F_{CON2}$ and $F_{CON3}$ the microcontroller can set the power supply voltage level of each voltage controlled oscillator and its emitting power. Additionally the microcontroller 101 is sending a digital signal $D_{OUT}$ to the digital to analog converter 104 which is in turn converted to an analog voltage level by the said converter 104. The said digital signal $D_{OUT}$ is corresponding to a frequency setting for the firing voltage controlled oscillator 106, 107 or 108. The analog voltage signal $A_{OUT}$ is fed to a signal conditioning circuit 105 and is converted to a higher level voltage necessary for the frequency control of the VCOs.

Firing of more than one voltage controlled oscillators at the same time with separate control of the emitting frequencies for the said oscillators can be achieved with the plurality of DAC 104 connected to the plurality of signal conditioning circuits each connected to the appropriate voltage controlled oscillator 106, 107 and 108.

Figure 2:
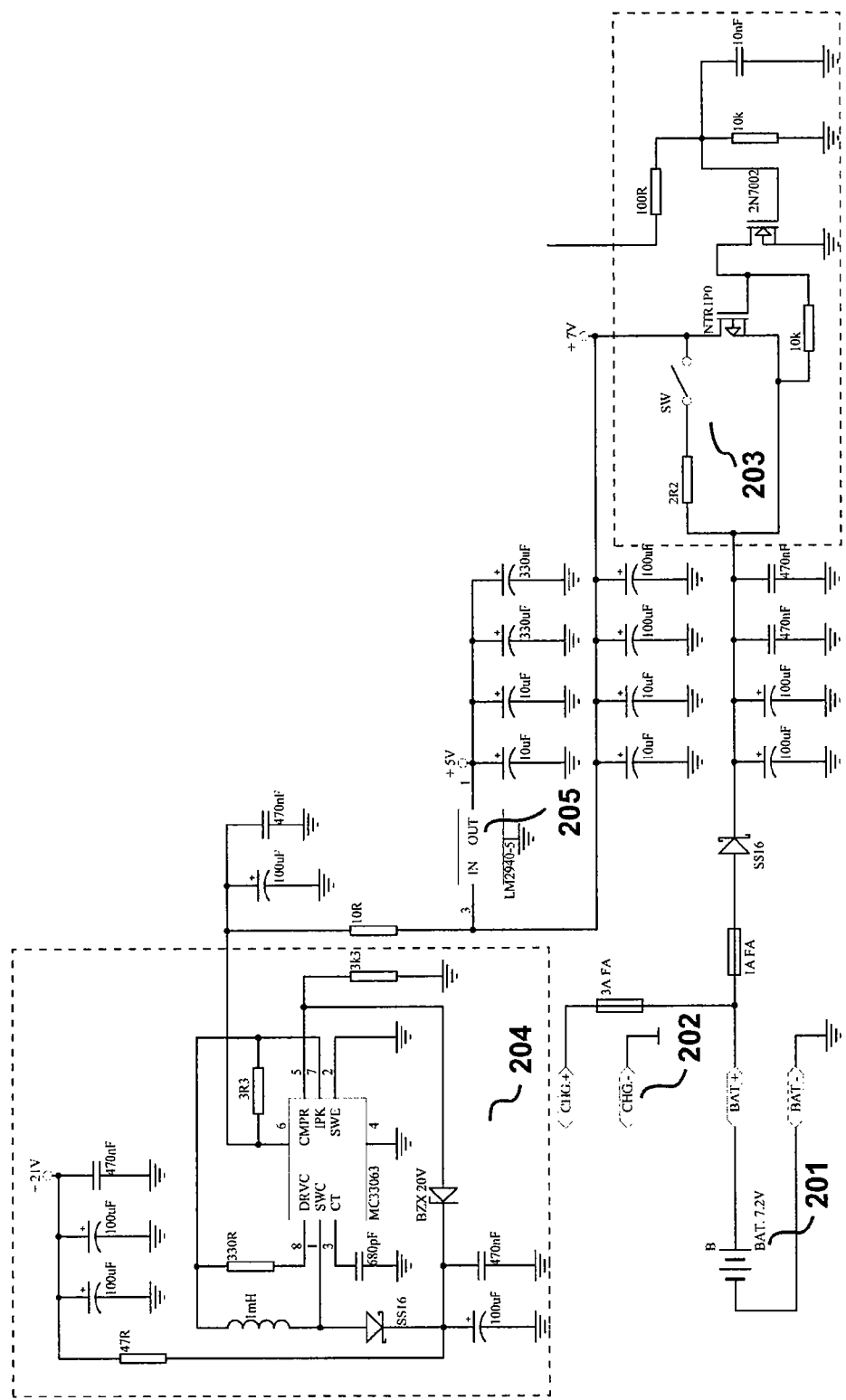
FIG. 2 shows the power supply circuit of the calibrator which converts battery voltage of 6-8.2 V to stabilised 5 V and stepped-up 21 V voltage.

With reference to FIG. 2 the preferred embodiment will be disclosed in detail. The FIG. 2 shows a preferred embodiment of a power supply section of the invention. The device is preferably powered by a lithium-ion battery 201 of about 7.2 V or trough an external power source connected to the power terminals 202. Power line from the source is then connected to filtering elements trough a safety fuse and reverse polarisation protection diode. Power line from the filtering elements leads to the powering-on circuit 203 which powers-on the device upon press of the power-on switch by the user. Power-on circuit 203 additionally enables for the computing means to control the turn-off time for the device and by doing so to optimise the power consumption of the device and battery life. Output power line from a power-on circuit 203 is connected to second filtering elements and then to a voltage stabilizer 205 which converts the power line voltage to a stabilized voltage of 5 V necessary for the operation of logic elements. Preferred stabilizer element 205 is National LM2940-5 integrated circuit or similar equivalent. Additionally the output power line of second filtering elements is connected to a voltage step-up converter 204 which is converting the electrical energy of the input power line to an electrical energy of about 21 V. Preferred integrated circuit for the DC-DC conversion is Onsemi MC33063, such type of a device requires only several external components thus reducing size and increasing reliability and can supply currents of over 100 mA.

Figure 3:
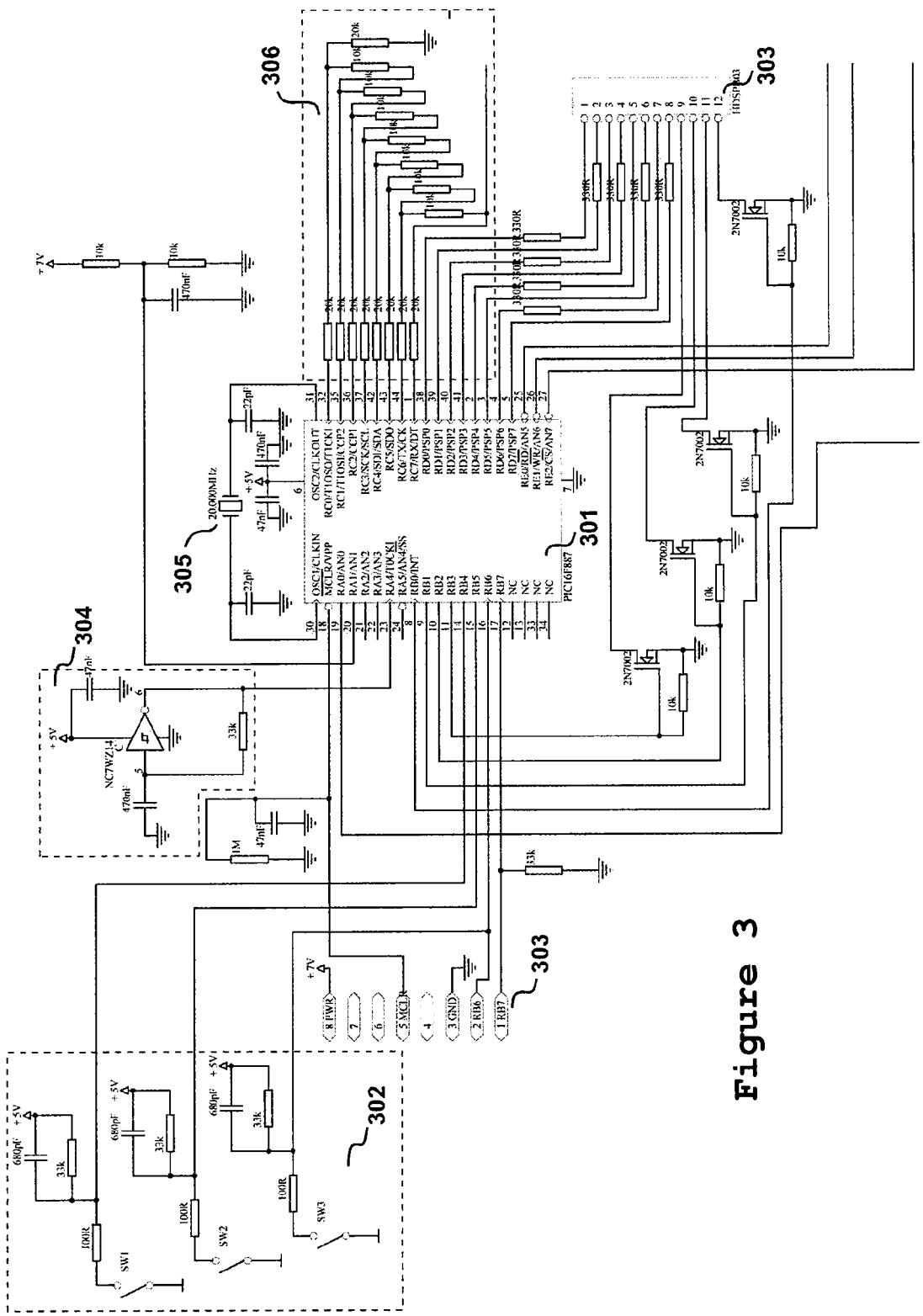
FIG. 3 shows a microcontroller with it's inputs connected to keypad switches and it's outputs connected to a digital to analog resistor converter circuit, LED Display and the oscillator firing controls.
Figure 4:
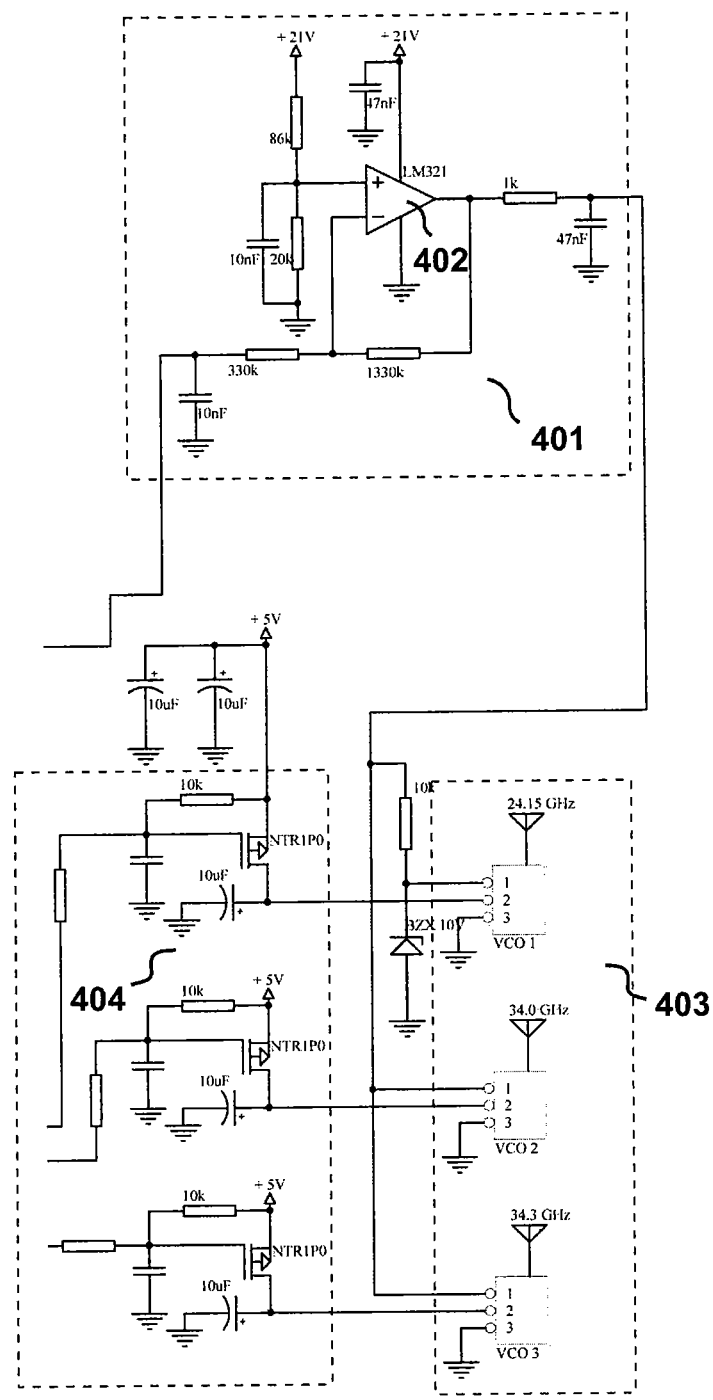
FIG. 4 shows the final stage with a signal conditioning circuit that outputs voltage control signal and voltage controlled oscillators with their firing controls and antennas.

As shown in FIG. 3 the microcontroller 301 such as the Microchip PIC16F887 is connected to the keypad key switches 302, terminal for exterior connections and program code upgrading 303, low frequency oscillator 304, high frequency and stability crystal 305, digital to analog converter 306 or in other embodiment a plurality of DAC, a display 303, a powering-on circuit 203 and going to the FIG. 4 VCO firing controls 404. Key switches 302 convert user commands to a digital signal which is read by the microcontroller 301. A microcontroller 301 is showing the present status of the device and other possible messages, like the low battery warning or the turning-on and off messages to a user trough a dot matrix or a LED display preferably the Agilent HDSPB03. The display is activated by powering on LED segments trough resistor network and trough a MOSfet segment controllers. Low frequency oscillator 304 is producing a slow time clock that is used by a microcontroller 301 for running in a sleep mode or to turn-off the device. Active element of this oscillator is preferably a NTX NC7WZ14 hex-schmit inverter. High stability quartz crystal 305 is used by the microcontroller 301 for timing of it's main functions, ABRACON ABM3B crystal offers only 20 ppm deviation from the nominal frequency and it is a preferable choice for the device. High stability of the timing mechanism of a microcontroller assures that the running of a test procedure will be performed with repeatability. Digital-to-Analog converter 306 is preferably formed in the standard inexpensive manner by using the resistor R-2R ladder network connected as shown in FIG. 3. Thus, DAC 306 generates an output signal $A_{OUT}$ that corresponds to a digital output set by the microcontroller 301. Digital signal $D_{OUT}$ determinates the frequency of the radio signal that will be emitted. What digital data corresponds to what exact frequency of the emitted radio signal is determined empirically and corresponding digital values are pre-stored in the test procedures so that running of a test procedure excites the desired frequency of the emitted radio signal. The resolution of the $D_{OUT}$ control signal depends on the reference voltage of the DAC and number of bits used to form the digital signal.

$$Resolution = \frac{Reference\_Voltage}{2^{nbits}}$$

Preferably, the reference voltage is 5V and is set by the operating voltage of the microcontroller 301. Preferred embodiment shows an 8 bit DAC 306 so 256 different voltage levels of the $A_{OUT}$ signal are achievable and the frequency can be set to 256 different values for each voltage controlled oscillator. Achieved analog voltage signal $A_{OUT}$ resolution is then 0.0195 V that provides good linearity of frequency control.

As shown in FIG. 4 the firing controls 404 of the voltage controlled oscillators 403 are controlled by outputs of the microcontroller 301. The firing controls conduct power supply current to the VCOs 403, by regulating the gate voltage of the active element of the firing controls the amount of current given to the VCOs 403 can be regulated and consequently a VCO 403 output power is also regulated. Active element with enough current capacity and regulation possibility such as the Onsemi NTR1P0 MOSfet configured as shown on the FIG. 4 is preferred. Gate voltage is set by the microcontroller 301 trough regulating the duty cycle of the digital signal led to the RC element connected between the gate and the microcontroller 301. When duty cycle is 100% the gate voltage is 5 V and a VCO is turned off, when duty cycle is 0% the gate voltage is 0 V and a VCO emits at full power. Duty cycle values in between and their corresponding output power values are empirically determined and pre-stored in test procedures.

The signal conditioning circuit 401 is realized preferably by using the National LM321 amplifier 402 configured as shown on FIG. 4. High value resistors in the feedback connection of the inverter amplifier 402 provide almost no sinking of converted analog voltage signal $A_{OUT}$ and benefit the low circuit current consumption. Resistor divider on the (+) input of the inverting amplifier 402 provides the voltage inverting level. Configured in the said manner the output of the inverting amplifier 402 has the voltage level of about 20V when a DAC 306 output is 0 V and when a DAC 306 output increases to 5 V—output voltage linearly decreases to 0 V. Conversion to a higher level voltage is necessary to achieve full range of frequency control of a voltage controlled oscillators 403.

Voltage controlled oscillators 403 preferably used are Microwave devices MD9405. They exhibit good frequency control trough applying a frequency control voltage in range of 0 V to 20 V and have moderate output power of 10 mW at full power supply of 5 V. The basic description of a voltage controlled oscillator operation is a generation of microwave oscillations by a polarised Gunn diode which is positioned in chamber of specific dimensions calculated to produce wanted frequency of the signal. Additionally in the chamber is also located a varactor diode which alters the frequency of the generated microwave signal with the change in frequency corresponding to the polarisation voltage applied to the varactor diode. Microwave signal output is radiated from the chamber trough an antenna, preferably a horn antenna.

Microcontroller 301 controls the frequency and power of the VCO output depending on the algorithm that leads it trough test procedures.

Figure 5:
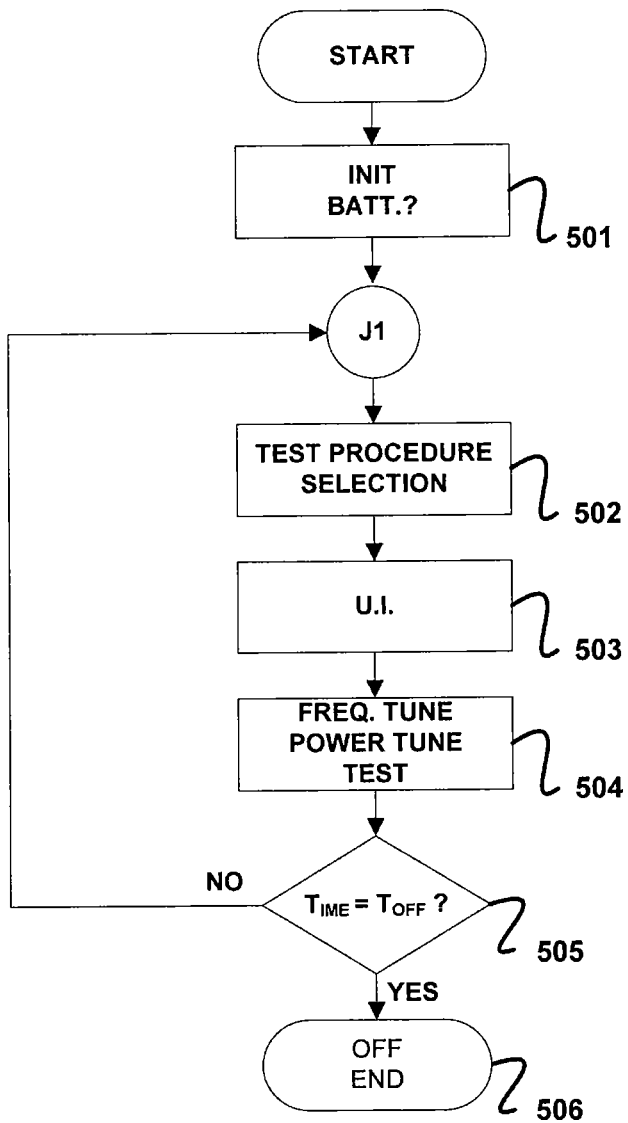
FIG. 5 discloses the flow chart describing the program algorithm of the microcontroller.

The logic of the algorithm is illustrated by the flow chart on FIG. 5. Said Microchip PIC16F887 microcontroller has available 368 8-bit registers that present the RAM memory.

Variables used by the program logic are located in the RAM registers. The microcontroller ROM memory is preferably used for storing the Program code and test procedures and should be pre-programmed adequately.

Preferably, the clock frequency of the crystal oscillator 305 is adjusted to 20 MHz that results in one instruction cycle time of 0.2 μs which is optimal speed for the microcontroller 301. The initialization routine of the microcontroller program is given by the block 501.

The block 501, registers and microcontroller peripherals are initialized. Battery voltage is checked trough the embedded comparator unit in the microcontroller 301, if the level is inadequate a warning message is shown on the display 303 and the device powers off, if voltage is adequate the process continues to the block 502. Next, the program 502 waits for the user to select one of a pre-stored test procedures or to enter a custom defined test-procedure. Choices are made trough the use of a user interface 503, a keypad 302 and a display 303. Depending on which test procedure is selected different message on current frequency and power level will be shown on the display 303. As the microcontroller starts to run a selected test procedure 504, the frequency and power settings are adjusted accompanied by a microwave radio signal being emitted by the device. Next the program checks the unattended time passed 505 and if it is greater than the pre-set turn off time the device continuous to block 506 which turns off the device. If the turn off time is not reached the device returns to the test procedure selection 502.

It should be understood that the invention is not limited by the embodiment described above, but is defined solely by the claims.

The invention claimed is:
1. A multiband radar detector calibrator comprising:
  a microcontroller that comprises a pre-stored values in a database and an algorithm-decision logic;
  a test procedure comprising a sequence of actions stored into said microcontroller and executed in a precisely timed manner defining an output pattern of a microwave radio signal;

a plurality of digital to analog converters, which convert digital signals $D_{OUT}$ from said microcontroller into a plurality of analog signals $A_{OUT}$;

a plurality of conditioning circuits used to convert said analog signals $A_{OUT}$ into voltage levels $V_{CON}$;

voltage controlled oscillators equipped with appropriate antennas, which oscillating frequencies are controlled by said voltage levels $V_{CON}$, and their firing states are controlled via microcontroller signals ($F_{CON1}$, $F_{CON2}$, $F_{CON3}$) that enable individual variation of output power of said voltage controlled oscillators; and a user interface comprising of a plurality of key switches and a display, that enables selecting and verifying of the test procedures pre-stored within the microcontroller, resulting in a generated signal with a complex pattern comprising separated signals produced from one or more of said voltage controlled oscillators, wherein said test procedure comprises:

a) forming a calibration signal or signals with the pattern that increases the power level of said calibration signal by any of the voltage controlled oscillators in time;

b) activating previously inactivated voltage controlled oscillators to emulate reflections of the original radar signal;

c) interrupting the emission of said calibration signal in step a) to emulate a burst constant wave type of a radar emission; and d) producing the signal that is a combination of any signal form defined in the previous steps b)-c), in order to verify the operation of the radar detector device as it would be used in the field.

2. A method of calibrating a radar detector in order to verify the operation of the radar detector device as it would be used in the field, comprising:

a) forming a calibration signal or signals with a pattern that increases a power level over time;

b) emulating reflections of an original radar signal;

c) interrupting the emission of said calibration signal in step a) to emulate a burst constant wave type radar emission; and d) producing a signal that is a combination of any signal from the previous steps b)-c).

3. A multiband radar detector calibrator for carrying out the method of claim 1.

* * * * *